United States Patent
Furusjö et al.

(10) Patent No.: US 11,149,221 B2
(45) Date of Patent: Oct. 19, 2021

(54) THERMOCHEMICAL CONVERSION OF BIOMASS

(71) Applicant: KIRAM AB, Bjärred (SE)

(72) Inventors: Erik Furusjö, Stockholm (SE); Kentaro Umeki, Luleå (SE); Rikard Gebart, Gärdesgatan (SE); Lars Stigsson, Bjärred (SE)

(73) Assignee: KIRAM AB, Bjärred (SE)

( * ) Notice: Subject to any disclaimer, the term of this patent is extended or adjusted under 35 U.S.C. 154(b) by 0 days.

(21) Appl. No.: 16/761,203

(22) PCT Filed: Nov. 6, 2018

(86) PCT No.: PCT/SE2018/051133
§ 371 (c)(1),
(2) Date: May 1, 2020

(87) PCT Pub. No.: WO2019/093949
PCT Pub. Date: May 16, 2019

(65) Prior Publication Data
US 2020/0291314 A1 Sep. 17, 2020

Related U.S. Application Data

(60) Provisional application No. 62/582,374, filed on Nov. 7, 2017.

(51) Int. Cl.
*C10J 3/52* (2006.01)
*C10J 3/72* (2006.01)

(52) U.S. Cl.
CPC ............ *C10J 3/526* (2013.01); *C10J 3/721* (2013.01); *C10J 2300/092* (2013.01);
(Continued)

(58) Field of Classification Search
CPC .... C10J 3/526; C10J 3/721; C10J 2300/0906; C10J 2300/092; C10J 2300/0926;
(Continued)

(56) References Cited

U.S. PATENT DOCUMENTS 3,567,412 A    3/1971   Lefrancois et al.
4,663,931 A *  5/1987   Schiffers .............. C07C 29/151
                                                          60/784
(Continued)

FOREIGN PATENT DOCUMENTS

CN    106047414 A    10/2016
EP      3004455 A1    4/2016
(Continued)

OTHER PUBLICATIONS

Ramsurn et al., "Enhancement of biochar gasification in alkali hydrothermal medium by passivation of inorganic Components using Ca(OH)$_2$", Energy Fuels, 25 (5), 2389-2389, doi: 10.1021/ef200438b, Apr. 11, 2011.
(Continued)

*Primary Examiner* — Matthew J Merkling
(74) *Attorney, Agent, or Firm* — Moser Taboada

(57) ABSTRACT

The present invention is directed to a process for the production of a syngas suited for further conversion to fine chemicals and/or automotive fuels from biomass by a thermochemical process conducted in a several steps procedure, said process comprising; a) Providing a stream of biomass material; b) Providing an aqueous alkaline catalyst stream comprising sodium and/or potassium compounds; c) Mixing comminuted biomass and alkaline catalyst and optional additives to form an alkaline biomass slurry or suspension; d) Treating alkaline biomass slurry or suspension in a hydrothermal treatment reactor at a temperature in the range of 200-400° C. and a pressure from 10-500 bar, forming a
(Continued)

bio-oil suspension comprising liquefied biomass and spent alkali catalyst; e) Directly or indirectly charging the bio-oil suspension from step d), after optional depressurization to a pressure in the range 10-100 bar, heat exchange and separation of gases, such as $CO_2$, steam and aqueous spent catalyst into a gasification reactor operating in the temperature range of 600-1250° C. thereby forming a syngas and alkali compounds; and f) Separating alkali compounds from a gasification reactor or from syngas and recycling alkali compounds directly or indirectly to be present to treat new biomass in the hydrothermal biomass treatment reactor of step d) and/or recycling aqueous alkali salts to a pulp mill chemicals recovery cycle.

16 Claims, 1 Drawing Sheet

(52) U.S. Cl.
CPC .................. *C10J 2300/0906* (2013.01); *C10J 2300/0926* (2013.01); *C10J 2300/0966* (2013.01); *C10J 2300/0976* (2013.01); *C10J 2300/0986* (2013.01); *C10J 2300/1659* (2013.01); *C10J 2300/1807* (2013.01); *C10J 2300/1869* (2013.01); *C10J 2300/1892* (2013.01)

(58) Field of Classification Search
CPC ........ C10J 2300/0966; C10J 2300/0976; C10J 2300/0986; C10J 2300/1659; C10J 2300/1807; C10J 2300/1869; C10J 2300/1892
See application file for complete search history.

(56) References Cited

U.S. PATENT DOCUMENTS

| | | | |
|---|---|---|---|
| 4,935,567 A | 6/1990 | Yokoyama et al. | |
| 9,212,317 B2* | 12/2015 | Iversen | C10G 1/086 |
| 10,584,298 B2* | 3/2020 | Joronen | C10L 10/04 |
| 2010/0255554 A1* | 10/2010 | Benson | C12P 7/10 |
| | | | 435/165 |
| 2010/0313882 A1* | 12/2010 | Dottori | C08B 37/0057 |
| | | | 127/37 |
| 2013/0055623 A1* | 3/2013 | Iversen | C10G 1/086 |
| | | | 44/385 |
| 2014/0102002 A1* | 4/2014 | Furusjo | D21C 11/14 |
| | | | 48/197 FM |
| 2015/0080621 A1 | 3/2015 | Boon et al. | |
| 2019/0203134 A1* | 7/2019 | Joronen | C10L 10/04 |

FOREIGN PATENT DOCUMENTS

| | | |
|---|---|---|
| WO | WO-2010046538 A2 | 4/2010 |
| WO | WO-2012091906 A2 | 7/2012 |
| WO | WO-2013/184317 A1 | 12/2013 |
| WO | WO-2018115593 A1 | 6/2018 |

OTHER PUBLICATIONS

International Search Report on Application No. PCT/SE2018/051133 dated Jan. 30, 2019.
Supplementary European Search Report dated Jul. 12, 2021 for application No. EP18875922.

* cited by examiner

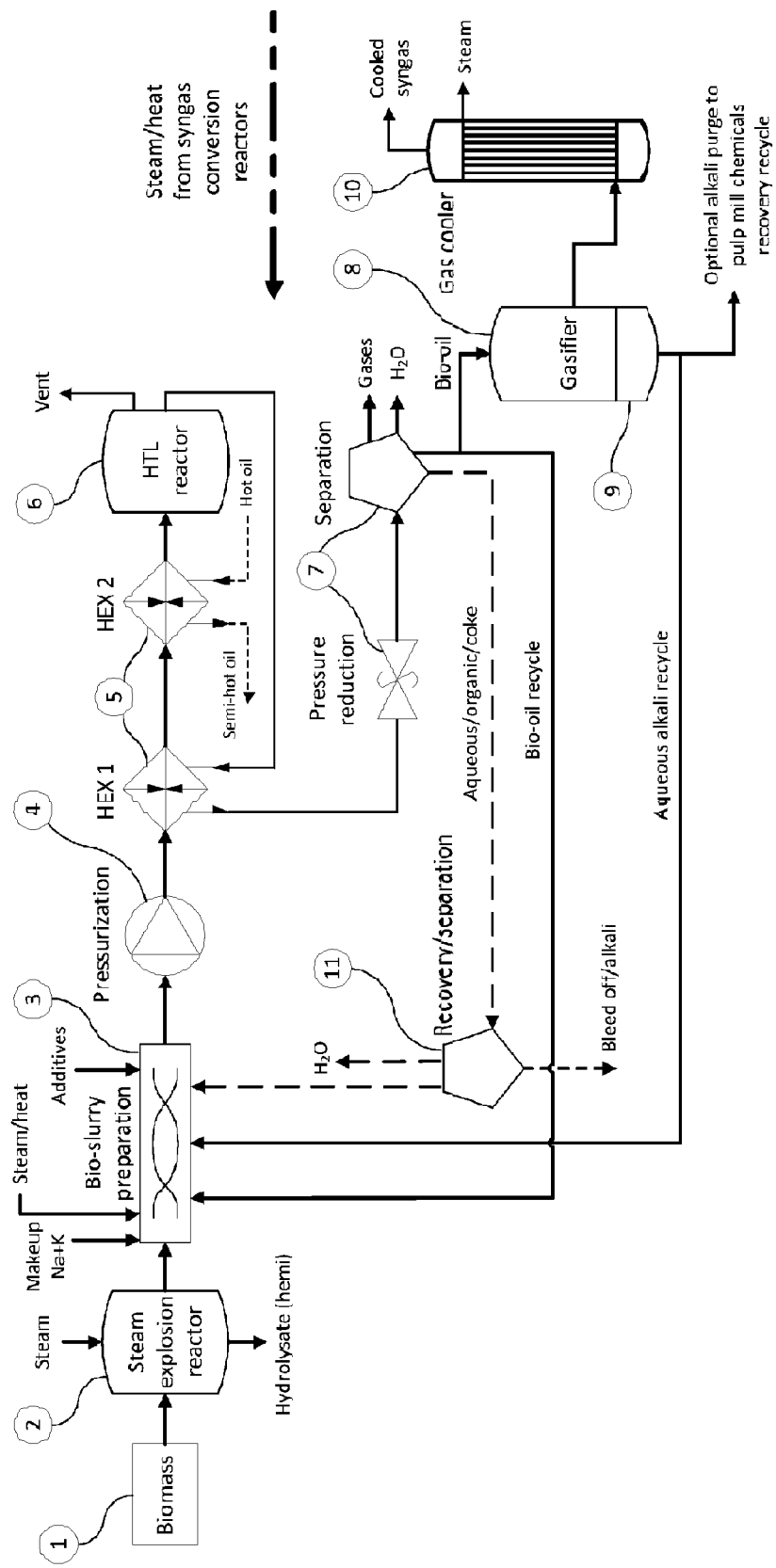

THERMOCHEMICAL CONVERSION OF BIOMASS

The present invention relates to a process for producing synthesis gas from biomass by preparing a pumpable mixture from the biomass by catalytic hydrothermal treatment of the biomass followed by pressurized thermochemical conversion of a product stream from the hydrothermal treatment which forms a syngas comprising hydrogen and carbon monoxide. The invention also relates to an effective process for removing and recovering alkaline catalyst used in the hydrothermal and/or thermochemical processes. The biomass material of the present invention is derived from wood, organic waste or from dry and wet biomass in general including algae.

PRIOR ART AND BACKGROUND TO THE INVENTION

There are several complications associated with the use of biomass as energy source including high bulk volume and low calorific value often connected to high moisture content. In order to reduce these problems, the biomass may be pre-treated before a gasifier or combustion plant. Pyrolysis of the biomass is one method used for conversion of biomass to a liquid pumpable material. However, pyrolysis is a rather costly and cumbersome procedure and the produced bio-oil is acidic and still comprises a significant amount of bound oxygen in the order of 20-40% by weight of the bio-oil. Furthermore, the biomass needs to be dried and ground to fine particulates prior to pyrolysis. Hydrothermal treatment is another method used for partial and full liquefaction of biomass and can sometimes use alkali catalyst to improve feedstock conversion. In the kraft pulping process biomass/wood is treated with an aqueous alkaline solution in a digester at temperatures in the range of 120-200° C. Besides cellulose, which is the main product of the kraft process, a large fraction of the original wood is recovered in the form of alkaline liquid named black liquor. When hydrothermal treatment at higher temperatures, typically 250-400° C. approaching the supercritical point of water and above, is applied the cellulose fraction is also dissolved in the alkaline liquor.

Hydrothermal treatments of wood and other types of biomass such as algae in alkali for the manufacturing of a bio-oil are well known in the art.

Sugano and coworkers explored hydrothermal liquefaction of woody biomass at temperatures in the range of 150-350° C. using waste black liquor from a kraft mill as supporting alkali. The recovered bio-oil had a calorific value of 27-28 MJ/kg. Yokohama in U.S. Pat. No. 4,935,567 is describing a continuous hydrothermal biomass liquefaction process operated in a temperature range of 250385° C. The biomass is treated in the presence of one or more solvents and an alkaline catalyst giving the reaction mixture a pH of 10-14. The solvent is recycled and after cooling a liquid bio-oil (7 500-8 000 kcal/kg) is recovered and separated from the aqueous phase. The biomass could be wood and cellulose-containing waste materials.

In WO 2010/046538 a continuous hydrothermal process for liquefaction of biomass mixtures at a temperature of 300° C. and upwards is described wherein the process may be integrated in a kraft pulp mill using black liquor as the source of alkali catalyst. This provides the advantage of locally produced reactants used in the hydrothermal treatment of the biomass. The inventors state that hydrothermal gasification reactions require temperatures of about 500-700° C., whereas liquefaction reactions dominate at lower temperatures. The reaction time can be varied from 30 seconds to 15 minutes. After depressurization and cooling the reaction products are recovered.

In WO 2012091906 a process for hydrothermal processing of black liquor at a temperature in the range of 250-300° C. is proposed. The produced liquid or bio-oil including degraded compounds can be separated and processed for use in downstream aromatic and other chemical processes such as hydroprocessing. The downstream processing may include deoxygenating, dehydrogenating, and/or cracking in the presence of a catalyst.

Finally, in EP3004455, a method for the treatment of spent pulping liquor in the presence of alkaline cooking chemicals at a temperature from about 200-375° C. for production of liquid bio-oil is described. Aqueous spent cooking chemicals are recycled to a pulp mill chemicals recovery cycle and separated bio-oil may be upgraded to motor fuels by subsequent hydrogenation.

One of the major complications with these prior art disclosures is the difficulty of separating the alkaline catalyst from the bio-oil to a level permitting catalytic upgrade of the bio-oil for example by hydrogenation.

A key objective of the present invention is to provide a continuous process for liquefaction of a biomass mixture, catalytic conversion of the mixture in the presence of an alkaline catalyst forming a pumpable biomass liquid, thermochemical conversion of the pumpable biomass liquid to a syngas, efficient separation and recycle of the alkaline catalyst and upgrade of the carbon and hydrogen compounds originating in the biomass to fine chemicals and or automotive fuels.

Hydrothermal Liquefaction of Biomass (State of the Art)

Hydrothermal liquefaction (HTL) is a biomass-to-liquid process in which thermochemical decomposition of a biomass feedstock yields an oil-like product commonly referred to as bio-oil or biocrude. The approximate temperature range at which the chemical process can be described as HTL is 520-647 K. At below 520 K hydrothermal carbonization results in a hydrochar and at above 647 K, syngas is produced due to prevalent gasification reactions. Typical operating pressures of HTL applications are in the range of 4-22 MPa. Lower pressures do not allow for properly maintaining a liquid phase. The upper bound of the interval signifies the supercritical pressure of water, which may be exceeded. At supercritical conditions, issues relating to corrosion and poor heat transfer in heat exchangers may significantly affect the capital and operating costs of HTL processes.

An advantage of liquefaction is the ability to treat wet biomass without the necessity to dry the feedstock, although carbon efficiency is decreased with the increased amount of organic carbon in the aqueous phase. Pyrolytic mechanisms are activated in HTL, and consequently, presence of a catalyst is not critical to achieve depolymerization as such. The degree of depolymerization is, notwithstanding, enhanced. Issues may arise with the coexistence of alkali catalyst and the acids from the thermally treated feedstock which potentially react and yield salts. However, non-catalytic HTL runs the risk of favoring dominant acid-catalyzed polymerization reactions leading to solid products.

A HTL bio-oil is not to be considered petroleum analog. A wide diversity of oxygenated compounds can be found in the bio-oil, such as acids, alcohols, ketones, phenols (including guaiacol in the case of softwood lignin in the feed), naphthols, furans and esters.

In order to achieve similarity with readily available light and middle distillate hydrocarbon fuels, hydrotreating is necessary (untreated bio-oil is a viable direct substitute for heavy fuel oil). A fraction of the produced bio-oil may be recirculated to the bio-slurry preparation, in addition to partial recycle of a separated organic (including coke) aqueous recovery stream. An aqueous stream resulting from HTL treatment can optionally be further processed by catalytic hydrothermal gasification to produce hydrogen or undergo anaerobic digestion which, however, adds significantly to the capital cost of a HTL system.

BRIEF DESCRIPTION OF THE DRAWING

FIG. 1 shows an exemplary syngas production system.

Feed Preparation Process of the Present Invention

A liquid feedstock to a gasifier has many advantages, for example it can easily be pumped into a high-pressure gasification process, while feeding a solid feedstock to such a process at an even rate is often very challenging. In addition, a liquid feedstock can be atomized into small droplets which promote the feedstock conversion in the gasifier. A solid feedstock has to be milled or grinded which is often an energy consuming process. One example of a liquid biomass feedstock is black liquor from pulp mills, but the availability of black liquor is limited to pulp mills and its use as gasification feedstock may have large consequences in the pulping process. Hence, it is advantageous to use various forms of liquid biomass feedstocks for generation of synthesis gas from organic material.

In the present invention, a feed preparation process is used to produce a pumpable and atomizable feedstock from biomass. The biomass may be any type of organic material including but not limited to wood, other lignocellulosic material such as bark, algae or organic wastes. The feed preparation can be accomplished by different combinations of processes depending on the specific aims and the properties of the starting material. For many feedstocks a steam explosion treatment is a beneficial first step to improve the reactivity of the feedstock to further treatment. The steam explosion can also be combined with hemicellulose extraction, which is advantageous since it decreases the amounts of acids released from the feedstock in subsequent steps. Moreover, it is advantageous to remove highly oxygenated low calorific value fractions of the feedstock prior to liquefaction/slurrying, gasification and eventual upgrade of syngas to automotive fuels or fine chemicals.

After an optional size reduction step, the feedstock is subject to alkaline hydrothermal treatment. The alkaline conditions are obtained by adding a basic alkali metal salt such as sodium hydroxide, sodium carbonate, potassium hydroxide, potassium carbonate or any other basic alkali metal salt. Such basic salt is at least partly recycled from a gasifier slag removal system, such gasifier operating at least partly on the feedstock prepared by the procedure of the present invention. Alkali make up may consist of fresh alkali and/or alkaline streams discharged from an alkaline pulp mill operation well known to the artisan of pulp and paper manufacturing (black liquor, green liquor, white liquor, weak liquor, oxidized white liquor) A number of additional streams can optionally be added to the alkaline hydrothermal process, such as bio-oils, including glycerol, pyrolysis oil or recycled oil from the hydrothermal process. The purpose of adding bio-oils is to improve the flowability of the hydrothermally treated mixture. Other additives that can optionally be used are CMC, agents containing repeated ethylene oxide units or acrylamides or any other type of agent improving the rheology of the product.

The water content in the mixture fed to the hydrothermal treatment process is adjusted to obtain a product from the alkaline hydrothermal treatment with the desired properties but without any additional water. Typically, the water content of the mixture fed to the alkaline hydrothermal treatment is 50-90%.

The alkali metal salt addition to the alkaline hydrothermal treatment is adjusted to obtain the desired positive effect on the chemical reactions occurring during the process. Typically, this means that an alkaline pH is maintained in the hydrothermal treatment process. The alkali metal salt can be added in the form of an aqueous solution that is recovered and recycled from the subsequent gasification process or as another aqueous solution or as a solid salt or by any combination of these. If the alkali metal salt is recovered from the gasifier it is also possible to recover heat from the gasification process in this stream and thereby decreasing the energy demand of the process. Another means that can be used to decrease the energy demand of the process is heat exchange between the stream going into the alkaline hydrothermal process and the stream exiting the same process.

The alkaline hydrothermal treatment is executed at a temperature in the range of 200-400° C. and a pressure in the range of 10-500 bars. A mechanical processing of the mixture is optionally included during or after the alkaline hydrothermal treatment. The mechanical processing can for example be achieved by using a mixer in the vessel or by a pump or macerator connected to the hydrothermal treatment process.

After the alkaline hydrothermal treatment, removal of water can optionally be done in order to decrease the water content of the gasification feedstock: Too high water content may decrease the efficiency of the gasification process to undesirable levels. A water content of <40% is therefore desirable in the feed to the gasifier, preferably <30% and more preferable <20%. The water can be removed by a number of different methods, including but not limited to evaporation, centrifugation and membrane filtration. Optionally, also solid material, for example unconverted feedstock can be removed from the product of the alkaline hydrothermal treatment but it is also possible to keep any solid material in the mixture used as gasifier feedstock. In this case, the gasifier feedstock is in the form of a slurry.

Entrained Flow Gasification

Entrained flow gasification (EFG) is a principle for gasification in which solid or liquid feedstock is gasified in a co-flow with air or oxygen. The feedstock is fractionated into fine particles, either by milling (solid) or atomization (liquid), in order to achieve complete conversion of the feedstock and obtain a high quality syngas. In most cases the gasification temperature is well above the ash fusion temperature, resulting in a molten slag that can flow out of the gasifier. The high temperature also results in a clean syngas with low tar and methane content.

The choice of oxidant depends on the intended use of the syngas. For synthesis purposes the nitrogen concentration in the syngas should be minimized to avoid unnecessary inert ballast in the syngas that will affect the process economy and efficiency negatively. Hence, oxygen is the preferred oxidant for synthesis purposes. EFG is widely used for fossil feedstock gasification due to its scalability, syngas quality and ease of pressurization. Pressurization of the EFG process has several advantages. Firstly, it reduces the size of the process vessels which lowers the investment cost. Secondly, it becomes possible to match the syngas pressure to the downstream syngas conversion process which eliminates or reduces the need for syngas compression. As a result, the overall efficiency of the process is improved compared to gasification at atmospheric pressure. Thirdly, when the EFG process is operated at high pressure and with a direct quench that saturates the syngas with steam, it becomes possible to recover a large part of the sensible heat in the syngas at a high temperature. When the hot syngas exits the hot EFG reactor it is cooled down very quickly by evaporation of the water from the quench spray. As a result the sensible heat is transformed to latent heat in the steam phase. Further downstream, after the quench vessel, the syngas is typically cooled in a heat recovery steam generator (HRSG). When this happens, the steam in the syngas is condensed and releases its latent heat to the heat transfer surface at the steam saturation temperature. The steam saturation temperature depends on the gas pressure and the higher the pressure the higher is the saturation temperature. At 30 bar this temperature is about 220° C. which means that medium pressure steam can be generated by the HRSG. Even higher steam pressures can be generated by the HRSG when the gasification pressure is higher. Heat generated in this HRSG process step is advantageously transferred to the HTL feed preparation step of the present invention and more specifically transferred to a steam explosion feed preparation step and/or to a heat exchanger transferring heat to the biomass slurry feed prior to the HT liquefaction step.

Entrained flow gasification is widely used for coal and heavy fuel oil gasification. Typically, the reactor vessel is a vertical elongated cylinder but the burner arrangement differs significantly between different EFG designs. The most common types are made by GE (formerly known as Texaco), Shell and Uhde (Thyssen Krupp). An EFG gasifier may be of the updraft or downdraft type and burner arrangement may therefore differ significantly from one type of gasifier to another.

When the syngas is used for synthesis the hydrogen to carbon monoxide ratio must be balanced with respect to the stoichiometry of the end product. Typically, the $H_2/CO$ ratio will be close to unity while the desired ratio is 2-4, depending on the intended end product. To adjust the ratio, high temperature steam is added to the syngas in a "shift reactor" that converts some of the CO and steam to $H_2$ and $CO_2$. As a result, the chemical energy in the syngas is reduced somewhat. In accordance with one embodiment of the present invention an alternative or complement to shifting of the syngas, is to add hydrogen gas to the syngas. The addition of hydrogen increases the chemical energy which means that the total chemical energy in the syngas becomes significantly higher than before any addition of hydrogen. One preferred alternative for production of hydrogen is to electrolyze water in an electrolyzer operating at the same pressure as the EFG process. The by-product oxygen can preferably be used as oxidant in the gasifier, thereby improving the energy efficiency of the EFG process further. Depending on the size of the electrolyzer it might be possible to eliminate the air separation unit, which may reduce the capital expenditure for the overall process. For liquid feedstock such as the wood slurry or wood paste produced by the HTL pretreatment step described further herein, the atomization becomes crucial for the performance of the EFG process. Typical feedstocks have a high viscosity, even when preheated to high temperature, and this makes atomization challenging due to the target droplet size of around 100 microns. If the droplets are significantly larger, it becomes difficult to achieve complete fuel conversion before the droplet exits the EFG reactor, and this affects the overall efficiency and syngas quality negatively. In order to achieve the desired droplet size distribution a gas assisted atomization nozzle is typically used. The atomization agent can e.g. be steam or oxygen. The exact design of the nozzle is outside the scope of the present invention but a common principle is to let high speed gas shear the liquid or paste into thin sheets that are stretched into ligaments and then into small droplets.

Biomass based feedstocks differs in many ways from coal or heavy fuel oil in a gasification operation; in particular the reactivity is much higher for biomass. Research conducted by the research community and the inventors of the present invention has shown that alkali significantly enhances the gasification of biomass resulting in high cold gas efficiency at significantly lower gasification temperature than would be the case without alkali catalysts.

Of particular relevance for the present invention is the removal of alkali/slag from the gasification reactor and/or syngas. This alkali/slag removed is after optional filtering and concentration recycled fully or partly to the alkali catalytic hydrothermal pretreatment steps of the present invention. When an EFG is operated in slagging mode with a liquid slag it becomes very important to avoid fouling of downstream cold surfaces with solidified slag. The most common method to achieve this is to spray the hot syngas with an aqueous stream. This way the slag droplets that are suspended in the gas will solidify before they have a chance to impact on a surface. This method is commonly referred to as "direct quenching". Some or all of the water that is injected in the quench section of the gasifier will evaporate and add to the syngas flow. If enough water is injected to saturate the syngas with steam the steam content in the syngas will be high. If the pressure is high enough the steam concentration can be even higher than the rest of the syngas components. EFG gasifiers (updraft or downdraft) may also operate with a dry quench wherein the molten alkaline slag is dissolved outside the gasifier system.

Independent of the gasifier design, a distinguishing feature of the present invention is that the alkaline slag formed is separated from the gasification zone and/or syngas stream and is dissolved to form an aqueous alkaline liquid. Such alkaline liquid is transferred partly or fully to the hydrothermal biomass pre-treatment steps of the present invention, where it again is used to catalyze the hydrothermal bio-oil or bio-slurry forming process.

Part of the aqueous alkali recovered from the gasifier alkaline slag removal system can also be discharged to an alkaline pulp mill chemicals recovery cycle.

Effect of Alkali in Gasification

EFG with an alkali doped biomass-based feedstock (from 1% up to 30% alkali metal calculated on the dry weight of biomass) can be used to further enhance the reactivity and the gasification performance. This effect is of particular relevance for when practicing the current invention. Alkali metals have long been known to have catalytic effects in char gasification with more than 10-fold of increase in reactivity from original fuels. Char reactivity at low alkali content seems to increase linearly with alkali concentration in fuel until it saturates at around 0.1 mol/mol of alkali to carbon ratio. Catalytic activity of alkali is, however, deterred by the presence of certain types of other ash forming elements, especially Si and Al.

In recent years, the effect of alkali in reducing other undesired by-products from gasification has been also demonstrated in pilot-scale gasifiers. EFG operated with alkali-rich black liquor showed around 300° C. lower onset temperatures for the reduction in methane content, which is commonly used as a simple indicator for tar content, than that with alkali-poor stemwood. Based on lab scale gasification experiments carried out at 1000 C with various feedstock it has been shown that it is possible to obtain a sharp drop in char (solid residue), acetylene, heavy tar and soot when increasing from 0 to 2 wt % and higher of alkali content in the feedstock. Methane and light tar increases initially with increasing alkali metal content but is then reduced to below detection limits with feedstock alkali metal content of 5-10 wt %.

Table I below shows results from lab scale gasification experiments at 1000° C. with a high and low alkali metal lignin rich feedstock. The high alkali metal feedstock contains 5-10% w/w of alkali metals while the low alkali metal feedstock contains 0.2% w/w alkali metals. Experiments with black liquor feedstock (around 20% w/w of alkali metals and dry basis) are shown for reference. It is very clear that the high alkali metal content reduces dramatically the formation of many undesired by-products such as methane, tar, soot and solid residue (char).

TABLE I

| | Methane mol/(mol $H_2 + CO$) | Tar g/Nm3 | Solid residue % of fuel | Soot % of fuel |
| --- | --- | --- | --- | --- |
| High alkali | 0.010 | 0.736 | 0.5% | 0.0% |
| Low alkali | 0.059 | 15.46 | 26.6% | 8.8% |
| Black liquor | 0.015 | 0.656 | 5.1% | 0.0% |

Finally, addition of alkali in EFG lowers the melting temperature and viscosity of slags. An appropriate level of slag viscosity is required to protect refractory materials while avoiding the clogging at the outlet of EFG. Holmgren has demonstrated that slag viscosity of straw decreases to appropriate levels by adding alkali.

As a consequence of the positive effects from addition of alkali to the biomass feedstock in an entrained flow gasifier setup the gasifier can operate at a lower temperature than operation without alkali. The gasification temperature measured as average temperature in the reaction zone of the gasifier is kept lower than about 1200° C. and preferably lower than about 1100° C. Methane content of the syngas is also lowered by the addition of catalysts to the biomass gasifier feed and the methane content is therefore lower than 3% of dry syngas or preferably lower than 2% of the syngas and most preferred lower than about 1.5% of the syngas. The temperature is mainly controlled by the addition of more or less oxidant to the gasifier. Apart from the benefits with addition of alkali to the hydrothermal pretreatment step of the present invention, there are significant advantages with alkali present during gasification of biomass. Based on thermodynamic calculation, cold gas efficiency of alkali enriched feedstock could stay as high as 80-85% with negligible emissions at 1050 C while alkali poor original biomass requires ca. 1400° C. as gasification temperature, and the cold gas efficiency can be around 65-70%. However, one challenge with alkali rich fuels is that the corrosion of the construction materials in contact with the process increases significantly. One way to deal with corrosion from aggressive feedstock, e.g. alkali rich biomass, is to use a refractory material to protect the pressure vessel from contact with the corrosive compounds. Another way is to use a cooled screen for the same purpose. In this case the slag will solidify on the cool screen surface and thereby protect it from contact with hot slag. As a result, corrosion rates are reduced significantly. The advantage with a refractory lining is low heat loss which contributes to higher overall efficiency. The drawback is that refractory materials will suffer from spallation connected to chemical swelling and dissolution when alkali penetrates and reacts with the refractory material. The advantage with the cool screen is longer life due to the low temperature. The drawback is that heat losses are high and this impacts overall efficiency negatively.

An important component in a EFG process with high feedstock alkali content and a direct quench is the HRSG which is typically configured as a counter current condenser where the gas flows vertically upwards. If the gas is saturated at high pressure the steam concentration is high and when the condensed water falls back through the hotter syngas below it acts as a scrubbing liquid and removes particulates in the gas efficiently. The cool syngas after the HRSG will as a consequence have very low aerosol content and the gas cleaning requirements becomes correspondingly low.

EMBODIMENTS

Below some specific embodiment of the present invention are listed.

According to the present invention there is provided a process for the production of a syngas suited for further conversion to fine chemicals and/or automotive fuels from biomass by a thermochemical process conducted in a several steps procedure, said process comprising;

a) Providing a stream of biomass material;

b) Providing an aqueous alkaline catalyst stream comprising sodium and/or potassium compounds;

c) Mixing comminuted biomass and alkaline catalyst and optional additives to form an alkaline biomass slurry or suspension;

d) Treating alkaline biomass slurry or suspension in a hydrothermal treatment reactor at a temperature in the range of 200–400° C. and a pressure from 10-500 bar, forming a bio-oil suspension comprising liquefied biomass and spent alkali catalyst;

e) Directly or indirectly charging the bio-oil suspension from step d), after optional depressurization to a pressure in the range 10-100 bar, heat exchange and separation of gases, such as $CO_2$, steam and aqueous spent catalyst into a gasification reactor operating in the temperature range of 600-1250° C. thereby forming a syngas and alkali compounds; and f) Separating alkali compounds from a gasification reactor or from syngas and recycling alkali compounds directly or indirectly to be present to treat new biomass in the hydrothermal biomass treatment reactor of step d) and/or recycling aqueous alkali salts to a pulp mill chemicals recovery cycle.

According to one embodiment, additives are added to improve the pumpability and/or energy content of the biomass slurry suspension, such additives being polyelectrolytes, ethylene oxide adducts, CMC, triglycerides, crude fatty acids and/or glycerol.

According to another embodiment of the present invention, the aqueous alkaline catalyst in step b) comprises sodium and or potassium compounds recycled from step f).

Moreover, according to yet another specific embodiment, the biomass material is a biomass, e.g. organic biomass, comprising wood, other type of lignocellulosic material such as straw or bark, algae or organic waste, or mixtures thereof.

Furthermore, the biomass material may be pre-treated by a steam explosion treatment prior to step c). Moreover, according to one specific embodiment, the biomass material is pretreated by a steam explosion pretreatment wherefrom a stream of oxygenated hemicellulose decomposition products including acetic acids or acetic acid salts is discharged.

According to one specific embodiment of the present invention, the total water content in the alkaline biomass slurry or suspension fed to the hydrothermal treatment reactor of step d) is in the range of 30-90%. According to yet another specific embodiment, an organic aqueous liquid or slurry recovered from the alkaline hydrothermal treatment in step d) is subjected to separation of at least water or steam prior to charging into the gasification reactor of step e).

Moreover, according to one specific embodiment the bio-oil suspension charged into the gasification reactor in step e) has a water content in the range of 10-50%, preferably in the range of 20-30%.

Furthermore, according to one specific embodiment, the gasification reactor of step e) is an updraft or downdraft entrained flow gasifier where from molten alkaline ash or slag is at least partially separated as a liquid slag or by quenching with an aqueous liquid.

According to one embodiment, an oxygen gas is added to the gasification reactor of step e) to support gasification reactions and regeneration of alkaline catalyst. Moreover, oxygen may be used in the gasification reactor is supplied from an electrolysis process.

Furthermore, according to the present invention hydrogen gas from electrolysis may be added to the produced syngas or to a syngas conversion reactor.

According to yet another specific embodiment of the present invention, produced raw syngas is further treated by any or several of shift, carbon dioxide removal, sulfur compounds removal, filtration or adsorption. Furthermore, the produced syngas, optionally after purification, may be used for synthesis of Fischer Tropsh liquids or alcohols.

Moreover, according to yet another specific embodiment, heat from cooling syngas or excess heat generated in syngas conversion reactors are at least partially transferred to support steam explosion treatment or hydrothermal treatment of biomass or biomass suspensions.

A preferred embodiment of the present invention is described in the following text and with reference to FIG. 1.

1. Biomass feedstock consisting of wood in the form of woodchips, saw dust, bark, straw or the like (1) is charged to a reactor advantageously designed as a steam explosion pre-treatment reactor (2). In general steam explosion is a process in which woody biomass is treated with hot steam (from 180 to 240° C.) under pressure (from 1 to 3.5 MPa) followed by an explosive decompression of the biomass that results in a rupture of the biomass fibers' rigid structure. The sudden pressure release breaks up the wooden structure and this results in a better accessibility of the material for downstream hydrothermal liquefaction reactions and furthermore it enables the separation of a highly oxygenated stream (mainly hemicellulose decomposition products) from the material to be fed into the subsequent hydrothermal liquefaction process reactor. Depending on residence time and temperature, steam explosion can result in anything from small cracks in the wood structure, to total defibrillation of the wood fibers.

Acetic acid and other organic acids are released from the wood in this step and this results in partial hydrolysis of the cell wall components. It is well known that the use of diluted acids (i.e. sulfuric acid) or sulfur dioxide can accelerate the process i.e. result in higher hydrolysis rates of the hemicelluloses.

At least two streams are discharged from the steam explosion pre-treatment step, one stream comprising decomposed hemicellulose moieties and one stream comprising ruptured or fragmented biomass for example in the form of wood bundles or wood particles. The steam explosion pre-treatment step described herein is optional and may be replaced by other well-known processes for comminution of such as ball milling etc. If the biomass feed material is already comminuted and/or pumpable (algae slurries, liquid waste streams etc.) the material can be feed directly into the hydrothermal treatment step (2) of the present invention.

Another useful biomass pretreatment could be catalytic (transition metal, $SO_2$) organosolv cooking where after the cellulose fraction is separated and the lignin rich material is charged to become the feed biomass mixture the hydrothermal treatment step (2) of the present invention.

2. Biomass is after optional pre-treatment mixed with alkaline catalyst, and optional make up alkali and additives in a bio-slurry preparation step (3) pumped or fed by screw feeders (4) through one or more heat exchangers (5) into a hydrothermal treatment reactor (6) wherein it is reacted at high temperature and pressure in the presence of the alkaline liquid catalyst. The alkaline catalyst or make up alkali may consist of black liquor, membrane filtered black liquor, green liquor or other alkaline liquors comprising dissolved sodium carbonate or potassium carbonate or mixtures thereof.

Advantageously the alkaline catalyst comprises dissolved sodium and or potassium compounds recycled from the gasification reactor (8) slag removal system (9). With or without foregoing pre-treatment the biomass fed to the bio-slurry preparation step (3) may be composed of wood including but not limited to saw dust, finely comminuted wood, wood chips, bark, straw, biomass sludges, algae, food waste, sewage sludge and paper mill sludges. Additives are optionally added to this step (3) in order to improve the pumpability and/or energy content of the biomass slurry suspension, such additives being polyelectrolytes, ethylene oxide adducts, CMC, triglycerides, crude fatty acids or glycerol.

In the hydrothermal treatment reactor (6) the biomass slurry composition is hydrothermally and catalytically treated at a temperature from about 200-400° C. and at a pressure in the range of 10-500 bar during a time sufficient to liquefy at least part of the biomass. Preferably the temperature is in the range of 200–300° C. at a pressure from about 50-300 bar.

3. A hot mixture of destructured and at least partially liquefied biomass (bio-oil) and spent alkaline catalyst is discharged from the hydrothermal treatment reactor and directly or indirectly heat exchanged with incoming streams to the reactor. The bio-oil mixture is thereafter depressurized (to a pressure below about 100 bar) in depressurizing and separator units, such depressurizing for example performed by flashing and concomitant separation of gases/steam (7). Apart from volatile gases, steam and optionally aqueous alkaline compounds are separated from the bio-oil stream in the separator (7). The resulting bio-oil stream and spent alkaline catalyst is discharged from the separator and transferred directly or indirectly after further water separation or evaporation to a gasification reactor (8).

4. The bio-oil feed stream (still at pressure in the range of 10 to 100 bar from step 7) comprising organic compounds, organic particulates and spent alkaline catalyst is, after optional recycle of a portion of the bio-oil to any position upstream the hydrothermal treatment reactor (6), charged through a burner or atomizer arrangement into a gasification reactor (8), operating at a pressure in the range of 10-100 bar, together with an oxidant consisting of oxygen gas and/or high pressure superheated steam thereby gasifying the organic compounds present in the feed bio-oil stream. In addition, the spent alkaline catalyst is regenerated in the hot gasification zone of the gasifier forming sodium and/or potassium carbonates. The gasification reactor (8) operates in a temperature range of 900-1300° C. A raw syngas is formed comprising hydrogen, carbon monoxide and carbon dioxide.

Oxygen gas used as oxidant in the gasifier (8) is advantageously produced by electrolysis of an aqueous solution using green electricity. Hydrogen simultaneously formed may be used for hydrotreatment of biomass or is injected into the syngas or into any reactors installed for further conversion of syngas.

Spent alkaline catalyst droplets/particulates is separated from the formed syngas by gravity, washing, filtering or by other means and is dissolved in an aqueous liquid and recycled to the be present as active catalyst in the hydrothermal treatment step (6) of the invention and/or is recycled to the chemicals recovery cycle of a pulp mill. Prior to charging the recycled catalyst to the hydrothermal treatment step (6) it is passed through a separator (11) bleeding off non-process elements such as chlorides or silica in order not to bring forth enrichment of undesired material in the catalyst loop.

5. The raw syngas is cooled by injection of an aqueous liquid (quenching) and/or by heat exchange. A HRSG (heat recovery steam generator) (10) is installed in the syngas stream and steam generated may be used for upstream steam explosion treatment of biomass or heating of biomass suspensions prior to hydrothermal treatment. The syngas cooling and heat recovery step is combined with the separation of alkali catalyst entrained with the raw syngas. Cooled syngas substantially free from alkaline particulates is further treated (not shown in FIG. 1) by processes well known in the state of the art of syngas purification and conditioning (water gas shift, carbon dioxide removal, sulfur compounds removal, filtration, adsorption) to form a clean syngas comprising mainly hydrogen and carbon monoxide. The syngas can advantageously be used for manufacturing of hydrogen, methanol, fertilizers or renewable chemicals and fuels by well-known syngas conversion technologies. Any excess heat generated in exothermal syngas conversion reactors can be forwarded to upstream steam explosion treatment of biomass or heating of biomass suspensions prior to hydrothermal treatment. The clean syngas is advantageously converted to aviation fuel components by the Fischer Tropsch method. Paraffinic compounds produced by Fischer Tropsch can be upgraded to premium biofuel components in a petroleum refinery by standard refinery procedures such as hydrocracking, hydroisomerisation etc.

The invention claimed is:

1. A process for the production of a syngas suited for further conversion to fine chemicals and/or automotive fuels from biomass by a thermochemical process conducted in a several steps procedure, said process comprising;
   a) Providing a stream of comminuted biomass material;
   b) Providing an aqueous alkaline catalyst stream comprising sodium and/or potassium compounds;
   c) Mixing the comminuted biomass material and the aqueous alkaline catalyst and optional additives to form an alkaline biomass slurry or suspension;
   d) Treating alkaline biomass slurry or suspension in a hydrothermal treatment reactor at a temperature in the range of 200-400° C. and a pressure from 10-500 bar, forming a bio-oil suspension comprising liquefied biomass and spent alkali catalyst;
   e) Directly or indirectly charging the bio-oil suspension from step d), into a gasification reactor operating in the temperature range of 600-1250° C. thereby forming Han the syngas and alkali compounds; and
   wherein separating alkali compounds from a gasification reactor in step e) or from syngas and recycling alkali compounds directly or indirectly to be present to treat new biomass in the hydrothermal biomass treatment reactor of step d) and/or recycling aqueous alkali salts to a pulp mill chemicals recovery cycle, wherein the aqueous alkaline catalyst in step b) comprises sodium and/or potassium compounds recycled from step f).

2. The process according to claim 1, wherein the additives of step b) include at least one additive that is added to improve the pumpability and/or energy content of the biomass slurry suspension, such additives being polyelectrolytes, ethylene oxide adducts, carboxymethyl cellulose, triglycerides, crude fatty acids and/or glycerol.

3. The process according to claim 1, wherein the biomass material is a biomass comprising wood, other type of lignocellulosic material such as straw or bark, algae or organic waste, or mixtures thereof.

4. The process according to claim 1, wherein the biomass material is pre-treated by a steam explosion treatment prior to step c).

5. The process according to claim 1, wherein the biomass material is pretreated by a steam explosion pretreatment wherefrom a stream of oxygenated hemicellulose decomposition products including acetic acids or acetic acid salts is discharged.

6. The process according to claim 1, wherein the total water content in the alkaline biomass slurry or suspension fed to the hydrothermal treatment reactor of step d) is in the range of 30-90%.

7. The process according to claim 1, wherein an organic aqueous liquid or slurry recovered from the alkaline hydrothermal treatment in step d) is subjected to separation of at least water or steam prior to charging into the gasification reactor of step e).

8. The process according to claim 1, wherein the bio-oil suspension charged into the gasification reactor in step e) has a water content in the range of 10-50%, preferably in the range of 20-30%.

9. The process according to claim 1, wherein the gasification reactor of step e) is an updraft or downdraft entrained flow gasifier where from molten alkaline ash or slag is at least partially separated as a liquid slag or by quenching with an aqueous liquid.

10. The process according to claim 1, wherein an oxygen gas is added to the gasification reactor of step e) to support gasification reactions and regeneration of alkaline catalyst.

11. The process according to claim 1, wherein oxygen used in the gasification reactor is supplied from an electrolysis process.

12. The process according to claim 10, wherein hydrogen gas from electrolysis is added to the produced syngas or to a syngas conversion reactor.

13. The process according to claim 1, wherein the produced syngas is further treated by any or several of shift, carbon dioxide removal, sulfur compounds removal, filtration or adsorption.

14. The process according to claim 1, wherein the produced syngas, optionally after purification, is used for synthesis of Fischer Tropsch liquids or alcohols.

15. The process according to claim 1, wherein heat from cooling the syngas or excess heat generated in syngas conversion reactors are at least partially transferred to support steam explosion treatment or the hydrothermal treatment of biomass or biomass suspensions in step e).

16. The process according to claim 1, wherein step d) is performed after depressurization to a pressure in the range 10-100 bar, heat exchange and separation of gases, such as $CO_2$, steam and aqueous spent catalyst.

* * * * *